Aug. 20, 1968    J. ORTHEIL    3,397,719
HYDRAULIC PRESSURE ACCUMULATOR

Filed Aug. 30, 1965    2 Sheets-Sheet 1

Inventor:
Johannes Ortheil
by Michael J. Striker

United States Patent Office 3,397,719
Patented Aug. 20, 1968

3,397,719
HYDRAULIC PRESSURE ACCUMULATOR
Johannes Ortheil, Anrath, Germany, assignor to
Langen & Co., Dusseldorf, Germany
Filed Aug. 30, 1965, Ser. No. 483,771
3 Claims. (Cl. 138—30)

ABSTRACT OF THE DISCLOSURE

An hydraulic pressure accumulator in which annular rim portions which have respectively innner and outer frustroconical faces of a pair of cup-shaped members are press-fitted into each other with the rim of a flexible diaphragm clamped between a reduced diameter portion of the outer frustoconical surface on the rim portion of one member and the corresponding inner frustoconical surface of the other member.

---

The present invention relates to hydraulic pressures accumulators and especially to hydraulic pressure accumulators which are formed by a pair of cup-shaped members connected along annular rim portions thereof to each other and holding between these annular rim portions a flexible membrane which divides the interior of the pressure accumulator into two spaces separated from each other.

It is an object of the present invention to provide for a pressure accumulator of the aforementioned type in which the various components of the pressure accumulator can be easily assembled.

It is an additional object of the present invention to provide a pressure accumulator of the aforementioned type in which the danger of damaging the rim of the flexible diaphragm, which is formed from rubber or the like, during assembly of the pressure accumulator and during clamping the rim of the diaphragm between the rim portions of the two members is considerably reduced.

It is a further object of the present invention to provide for a pressure accumulator of the aforementioned type which is composed of relatively few and simple parts so that the pressure accumulator can be built at reasonable cost and will stand up trouble free under extended use.

With these objects in view the pressure accumulator according to the present invention mainly comprises a first cup-shaped member having an annular rim portion gradually widening towards its free edge, and a second cup-shaped member having an annular rim portion gradually narrowing towards its free edge and snugly received in the rim portion of the first member. The second member has an annular portion of reduced outer diameter extending in axial direction from its free edge so as to define with the opposite inner surface portion of the rim portion of said first member an annular space, and the pressure accumulator includes further a flexible diaphragm having a rim located in the aforementioned annular space and clamped between the outer surface of the annular portion of reduced diameter of the second member and the opposite inner surface portion of the first member so that the diaphragm divides the interior of the pressure accumulator into the two spaces.

In this arrangement the rim portions of the first and the second member will snugly engage each other along surface portions having greater diameters than that of the rim of the diaphragm and the rim portions of the first and second member are fixedly joined together at least in a region axially spaced from the rim of the diaphragm. Due to this arrangement, the danger of damaging the rim of the diaphragm during assembly of the accumulator by pressing the annular rim portions of the members into each other will be greatly reduced.

The rim portions of the two cup-shaped members which are in engagement with each other are preferably of frustoconical shape which are press fitted into each other and the frustoconical faces of the rim portions of the two members are preferably dimensioned in such a manner that at least one of the rim portions will be deformed in radial direction during pressing of the rim portions into each other. The engaging frustoconical faces of the rim portions are however dimensioned in such a manner that the deformation of the deformed rim portion or portions will stay within the limits of elastic deformaton thereof. At the same time the cone angle of the frustoconical surfaces of the two members is held so small so as to produce self-locking friction between the engaged frustoconical surfaces when the rim portions are pressed into each other. This arrangement has the further advantage that it is not necessary to machine the engaging surfaces of the rim portions of the two members to a perfect surface finish, but these rim portions may be produced with a relatively rough surface.

When the interengaged rim portions are fixedly connected by soldering or welding, it is preferred to form one of the rim portions with an annular groove extending from the frustoconical surface of the rim portion into the latter, and to provide an inlet and an outlet passage communicating with the annular groove so that during the welding operation a cooling fluid may be fed through this annular groove to prevent penetration of heat toward the rim of the diaphragm.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
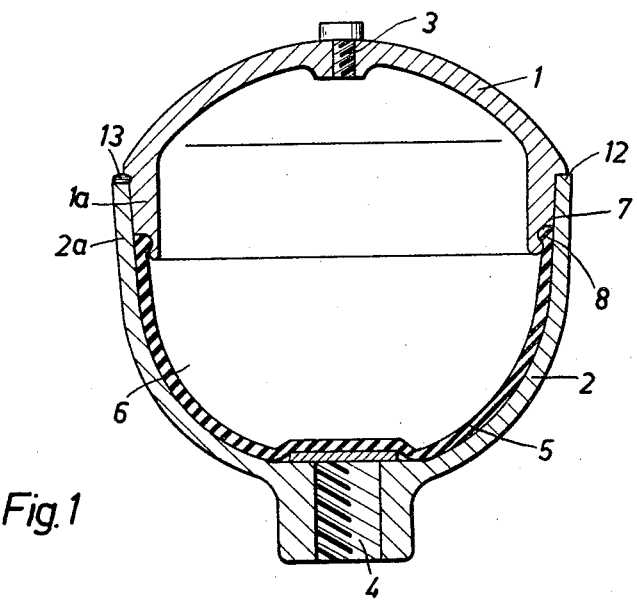
FIG. 1 is an axial cross section through one embodiment of the pressure accumulator according to the present invention.

Referring now to the drawings, and more specifically to FIG. 1 of the same, it will be seen that the pressure accumulator illustrated in FIG. 1 includes a substantially cup-shaped upper member 1 and a cup-shaped lower member 2. The member 1 has an annular rim portion 1a with an outer frustoconical surface gradually narrowing towards the free edge of the member 1, whereas the member 2 has a rim portion 2a having an inner frustoconical surface gradually widening towards its free edge. The member 1 has at the upper edge of its rim portion 1a a radially outwardly extending shoulder face 12, and the rim portion 1a of the member 1 being snugly received in the rim portion 2a of the lower cup-shaped member 2 with the frustoconical outer surface of the rim portion 1a of the upper cup-shaped member tightly engaging the frustoconical inner surface of the rim portion 2a of the lower cup-shaped member 2. The upper cup-shaped member 1 is formed adjacent the free edge thereof with an annular portion 7 of reduced diameter in which the beaded edge 8 of a flexible diaphragm 5, which may for instance be formed from rubber or similar flexible material is tightly received. The upper cup-shaped member 1 is provided with a gas inlet opening 3, which is gas-tightly closed by an appropriate closure member so that the space 6 defined by the inner surface of the upper cup-shaped member 1 and the upper surface of the diaphragm 5 may be filled with a gas under pressure. The lower cup-shaped member 2 is formed with a passage 4 extending therethrough which is adapted to be connected to a fluid under pressure so that the latter may be fed into the pressure accumulator at the other side of the diaphragm 5. A plate shaped member is preferably loosely placed against the inner end of the pasage 4 to prevent pressing of the diaphragm 5, into the passage 4 by the gas under pressure in the pressure accumulator during absence of fluid pressure in the passage 4.

The cone angle of the frustoconical outer surface of the rim portion 1a as well as the cone angle of the frustoconical inner surface of the rim portion 2a, is held very small, for instance in the order of about 3 degrees, so as to produce a self-locking friction between the outer surface of the rim portion 1a and the inner surface of the rim portion 2a when the rim portion 1a is pressed into the rim portion 2a. The smallest diameter of the frustoconical surface of the rim portion 1a, before it is press-fitted into the rim portion 2a, is smaller than the greatest diameter of the outer frustoconical surface of the rim portion 2a, but greater than the smallest diameter thereof, and the largest diameter of the frustoconical outer surface of the rim portion 1a is greater than the largest diameter of the frustoconical inner surface of the rim portion 2a, so that during press fitting of the rim portion 1a into the rim portion 2a at least one of the rim portions will be deformed in radial direction. In the embodiment shown in FIG. 1, in which the rim portion 1a is heavier than the rim portion 2a, it will obviously be the rim portion 2a which will be deformed in radial outward direction during press fitting of the rim portion 1a into the rim portion 2a. The differences between the aforementioned diameters are however held so small that the deformation of the rim portion 2a will be within the limits of elastic deformation of the material from which the rim portion is formed.

The described arrangement has the advantage that the rim portion 1a of the upper cup-shaped member 1, with the beaded rim of the diaphragm 5 located in the groove 7, can be properly inserted in the rim portion 2a of the lower cup shaped member 2 without any difficulty and without any danger to damage thereby the rim of the diaphragm 5.

The arrangement has the additional advantage that it is not necessary to finish the frustoconical surfaces of the rim portions 1a and 2a to obtain proper engagement of the two surfaces with each other, since the conical shape of these two surfaces will necessarily result in a proper engagement, especially when, as mentioned above, the minimum diameter of the outer frustoconical surface of the rim portion 1a is smaller than the maximum diameter of the inner frustoconical surface of the rim portion 2a, so that the free edge of the rim portion 1a can be easily introduced into the rim portion 2a, while pushing the rim portion 1a to its end position in which the free edge of the rim portion 2a will engage the shoulder face 12 can be carried out only under considerable pressure, whereby the rim portion 2a is radially deformed within its limits of elastic deformation. While in embodiment shown in FIG. 1, the rim portion 2a which has a smaller wall thickness than the rim portion 1a will be deformed, it is of course possible to construct the rim portions with a wall thickness so that during pressing of the rim portions into each other only the rim portion 1a will be deformed or that the deformation will occur in both of the rim portions.

After the rim portions are pressed in the aforementioned manner into each other they may be further fixed to each other against separation by an annular weld seam as indicated at 13. Instead, or in addition to, the annular weld seam 13, the rim portions 1a and 2a may also be cemented to each other at the engaging frustoconical faces thereof. It is also possible, to secure the two cup-shaped members further to each other, for instance by a ring surrounding the two cup-shaped members.

Figure 2:
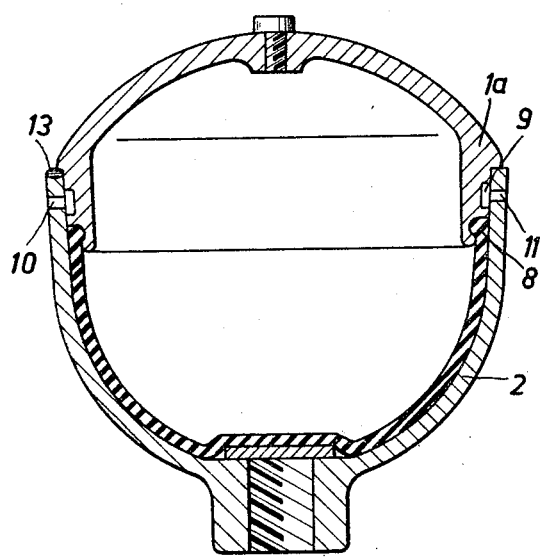
FIG. 2 is an axial cross section through an embodiment similar to that shown in FIG. 1, in which the rim portion of one of the members forming the pressure accumulator is formed with an annular groove.

FIG. 2 shows an arrangement which is very similar to the above described arrangement illustrated in FIG. 1. In the arrangement shown in FIG. 2, the rim portion 1a of the upper cup-shaped member 1 is provided with an annular groove 9 in its outer surface located between the groove 7 receiving the beaded rim 8 of the diaphragm 5, and the shoulder face 12 of the upper cup-shaped member. A pair of passages 10 and 11 spaced from each other are formed through the rim portion of the lower cup-shaped member 2 which communicate with the annular groove 9. This arrangement will protect the beaded rim 8 of the diaphragm 5 against excessive heating during forming of the weld seam 13. If necessary, a cooling fluid may be circulated through the groove 9 during forming of the weld seam 13.

Figure 3:
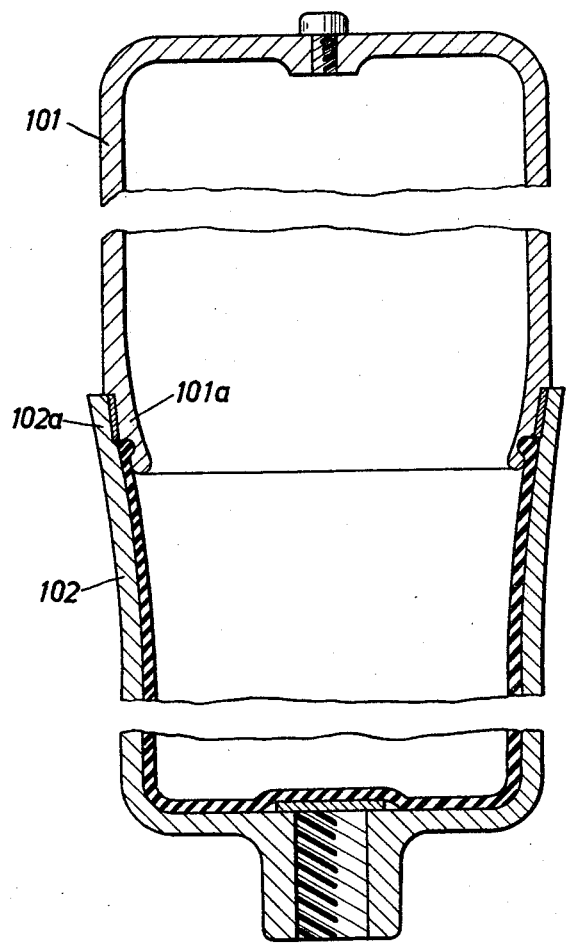
FIG. 3 is an axial cross section through a further embodiment of a pressure accumulator according to the present invention.

The arrangement as shown in FIG. 3 differs from the arrangement shown in FIG. 1 in that the cup-shaped members 101 and 102 are substantially cylindrical, whereas in the two other embodiments shown the cup-shaped members are substantially of semispherical configuration. Furthermore, in the arrangement shown in FIG. 3, the rim portion 101a of the upper cup-shaped member and the rim portion 102a of the lower cup-shaped member are cemented, soldered or welded to each other along the engaging frustoconical faces thereof, that is along surface portions, which in any axial cross-section have a dimension greater than the minimum wall thickness of the members 101 and 102.

It will be understood that each of the elements described above, or two or more together, may also find a useful application in other types of hydraulic pressure accumulators differing from the types described above.

While the invention has been illustrated and described as embodied in a hydraulic pressure accumulator having two cup-shaped members engaging each other along frustoconical surface portions thereof, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A hydraulic pressure accumulator comprising, in combination, a first cup-shaped member having a first annular rim portion with a frustoconical inner surface gradually widening toward the free edge of said first annular rim portion; a second cup-shaped member having a second annular rim portion with a frustoconical outer surface gradually narrowing toward the free edge of said second annular rim portion, said second annular rim portion being located within said first annular rim portion being press fitted into said first annular rim portion with said frustoconical outer surface in tight engagement with said frustoconical inner surface, the smallest diameter of said frustoconical outer surface of said second rim portion being, before it is press fitted into said first rim portion, smaller than the greatest diameter of said outer frustoconical surface of said first rim portion, but greater than the smallest diameter of the frustoconical surface of said first rim portion and the largest diameter of said frustoconical outer surface of said second rim portion being greater than the largest diameter of said frustoconical inner surface of said first rim portion so that during press fitting of said second rim portion into said first rim portion at least one of said rim portions will be deformed in radial direction, said second member having an annular portion of reduced outer diameter adjacent its free edge so as to define with the opposite inner surface portion of said rim portion of said first member an annular space; and a flexible diaphragm having a rim located in said annular space clamped between said outer surface of reduced diameter of said second member and the opposite inner surface portion of said first member, said diaphragm dividing the interior of said pressure accumulator into two spaces, said rim portions of said first and second members snugly engaging each other along surface portions having greater diameters than that of said rim of said diaphragm and being fixedly joined together at least in a region axially spaced from said rim of said diaphragm, whereby said hydraulic accumulator may be assembled by pressing said annular rim portion of said second member with the rim of said diaphragm located at the reduced outer diameter portion thereof into said rim portion of said first member without any danger of damaging the rim of the diaphragm.

2. A hydraulic pressure accumulator as defined in claim 1, wherein the difference between the diameters of said rim portions are so small that the deformation of the respective rim portion will be within the limits of elastic deformation thereof.

3. A hydraulic pressure accumulator, as defined in claim 1, wherein the cone angle of said frustoconical surfaces being so small as to produce self-locking friction between the inner frustoconical surface of said first member and the outer frustoconical surface of said second member when said frustoconical surfaces are tightly engaged with each other.

References Cited

UNITED STATES PATENTS

| | | | |
|---|---|---|---|
| 2,962,612 | 11/1960 | Lung | 138—30 X |
| 3,168,907 | 2/1965 | Mercier et al. | 138—30 |

FOREIGN PATENTS

| | | |
|---|---|---|
| 200,363 | 12/1965 | Sweden. |

LAVERNE D. GEIGER, *Primary Examiner.*

BRADFORD KILE, *Assistant Examiner.*